United States Patent
Langhammer et al.

(10) Patent No.: US 11,010,134 B2
(45) Date of Patent: May 18, 2021

(54) HIGH RADIX SUBSET CODE MULTIPLIER ARCHITECTURE

(71) Applicant: Intel Corporation, Santa Clara, CA (US)

(72) Inventors: Martin Langhammer, Alderbury (GB); Gregg Baeckler, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 636 days.

(21) Appl. No.: 15/718,978

(22) Filed: Sep. 28, 2017

(65) Prior Publication Data

US 2018/0364981 A1 Dec. 20, 2018

Related U.S. Application Data

(60) Provisional application No. 62/522,546, filed on Jun. 20, 2017.

(51) Int. Cl.
*G06F 7/533* (2006.01)
*G06F 7/523* (2006.01)
*G06F 7/48* (2006.01)

(52) U.S. Cl.
CPC .......... *G06F 7/523* (2013.01); *G06F 7/4824* (2013.01); *G06F 7/5336* (2013.01); *G06F 2207/4812* (2013.01)

(58) Field of Classification Search
CPC ....... G06F 7/533; G06F 7/5332; G06F 7/5334
See application file for complete search history.

(56) References Cited

U.S. PATENT DOCUMENTS 6,981,013 B1 * 12/2005 Pasqualini ................ G06F 7/53
708/625
2005/0050133 A1 * 3/2005 Lutkemeyer ............ G06F 7/533
708/620

OTHER PUBLICATIONS

Minu Thomas, "Design and Simulation of Radix-8 Booth Encoder Multiplier for Signed and Unsigned Numbers," IJIRST—International Journal for Innovative Research in Science & Technology, vol. 1, No. 1, Jun. 1, 2014, XP055518787, pp. 1-10.
E. Walters, "Array Multipliers for High Throughput in Xilinx FPGAs with 6-Input LUTs 11," Computers, vol. 5 , No. 4, Sep. 23, 2016, XP055519261, pp. 1-25.
S. Kumar, et al., "A fast-multiplier generator for FPGAs," Proceedings of the 8th International Conference on VLSI Design, Jan. 1, 1995, XP055519317, pp. 53-56.
Kumm Martin, et al., "An Efficient Softcore Multiplier Architecture for Xilinx FPGAs," 2016 IEEE 23nd Symposium on Computer Arithmetic (Arith), IEEE, Jun. 22, 2015, XP033195954, pp. 18-25.
Extended European Search Report for EP18171363.7 dated Nov. 12, 2018, pp. 1-8.

* cited by examiner

*Primary Examiner* — Chuong D Ngo
(74) *Attorney, Agent, or Firm* — Fletcher Yoder, P.C.

(57) ABSTRACT

Systems, methods, and devices for enhancing performance/efficiency of soft multiplier implementations are provided. More specifically, a method to implement soft multipliers with a high radix subset code architecture is provided. The techniques provided herein result in smaller multipliers that consume less area, improve packing, consume less power, and improve routing options on an integrated circuit.

20 Claims, 5 Drawing Sheets

HIGH RADIX SUBSET CODE MULTIPLIER ARCHITECTURE

CROSS REFERENCE TO RELATED APPLICATIONS

This application is a Non-Provisional application claiming priority to U.S. Provisional Patent Application No. 62/522,546, entitled "High Radix Subset Code Multiplier Architecture," filed Jun. 20, 2017, which is herein incorporated by reference.

BACKGROUND

The present disclosure relates generally to integrated circuits, such as field programmable gate arrays (FPGAs). More particularly, the present disclosure relates to soft multiplier logic implemented on an integrated circuit (e.g., an FPGA).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Machine learning is becoming an increasingly important application area. For example, it may be utilized in natural language processing, object recognition, bioinformatics, and economics, among other fields and applications. Therefore, improved implementation of machine learning across many different types of platforms, including FPGA, application specific standard product (ASSP), application specific integrated circuit (ASIC), central processing unit (CPU), graphics processing unit (GPU), and the like may be desirable.

Much of the computation involved in machine learning, regardless of the platform, is based on inference. That is, a system involved in machine learning may make predictions based on previously available data. As such, in order to run faster and more efficiently, the system may rely on many, low precision (i.e., fixed-point) computations instead of relying on slower, full precision (i.e., floating-point) computations. Thus, smaller, more efficient multipliers have become integral to performing calculations involved in machine learning.

Modern FPGA architecture may contain soft multipliers, which are memory based multipliers that take advantage of large internal memory I/O bandwidth to increase the number of available multipliers. Unfortunately, however, soft multiplier usage may be very expensive. Soft multipliers may consume significant area, power, routing and/or packing resources of the integrated circuit, and as such, they are not as efficient as they could be for use in machine learning applications.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices for enhancing performance/efficiency of soft multiplier implementations. Specifically, a method is provided to map a high Booth radix 8 subset coding to a single level of FPGA logic.

The techniques provided herein result in smaller multipliers that may consume less area on the integrated circuit. Further, packing may be much better for high density circuits. For example, using the disclosed techniques, soft multipliers may pack to a single level of logic, may utilize a smaller area, and may have a lower latency. Further, power consumption of these soft multipliers may be reduced and routability may increase dramatically.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to circuitry for enhancing soft multipliers implemented on an integrated circuit (IC). In particular, in certain embodiments, a high Booth radix 8 subset coding may be mapped to a single level of FPGA logic, which may result in soft multiplier size reduction and/or other efficiencies.

Figure 1:
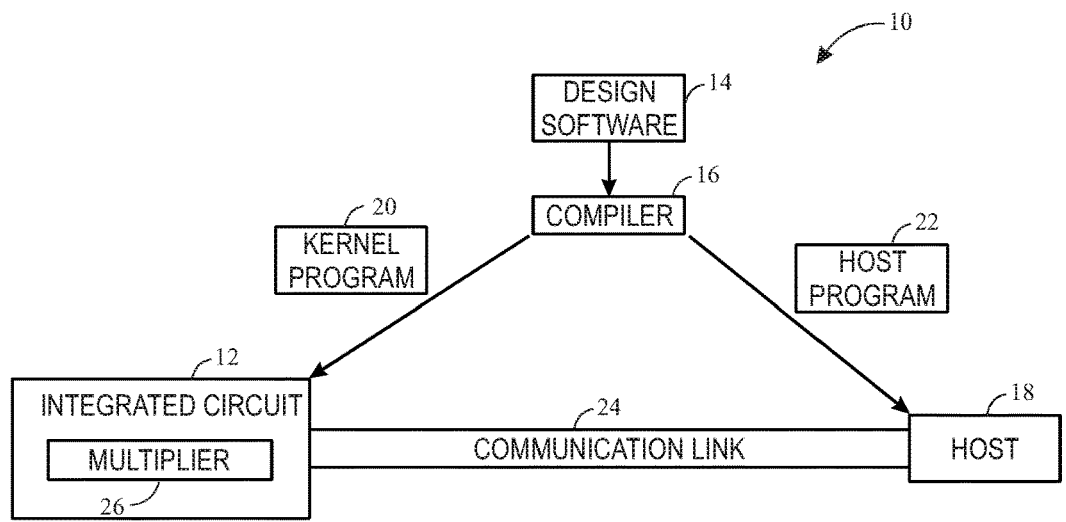
FIG. 1 is a block diagram of a system for implementing soft multipliers, in accordance with an embodiment.

With the foregoing in mind, FIG. 1 illustrates a block diagram of a system 10 that utilizes soft multiplier logic to affect a machine-implemented program. A designer may desire to implement functionality on an integrated circuit 12 (IC, such as a field programmable gate array (FPGA)). The designer may specify a high level program to be implemented, such as an OpenCL program, which may enable the designer to more efficiently and easily provide programming instructions to implement a set of programmable logic for the IC 12 without requiring specific knowledge of low level computer programming languages (e.g., Verilog or VHDL). For example, because OpenCL is quite similar to other high level programming languages, such as C++, designers of programmable logic familiar with such programming languages may have a reduced learning curve than designers that are required to learn unfamiliar low level programming languages to implement new functionalities in the IC.

The designers may implement their high level designs using design software 14, such as a version of Quartus by Altera™. The design software 14 may use a compiler 16 to convert the high level program into a low level program. The compiler 16 may provide machine-readable instructions representative of the high level program to a host 18 and the IC 12. For example, the IC 12 may receive one or more kernel programs 20 which describe the hardware implementations that should be stored in the IC. The host 18 may receive a host program 22 which may be implemented by the kernel programs 20. To implement the host program 22, the host 18 may communicate instructions from the host program 22 to the IC 12 via a communications link 24, which may be, for example, direct memory access (DMA) communications or peripheral component interconnect express (PCIe) communications. In some embodiments, the kernel programs 20 and the host 18 may enable multiplication, through multiplier(s) 26, which may be stored on the IC 12 and controlled by the host 18. The multiplier 26 may be implemented as a soft multiplier, or a memory based multiplier that may take advantage of large internal memory I/O bandwidth within the IC 12 to increase the number of available multipliers.

Figure 2:
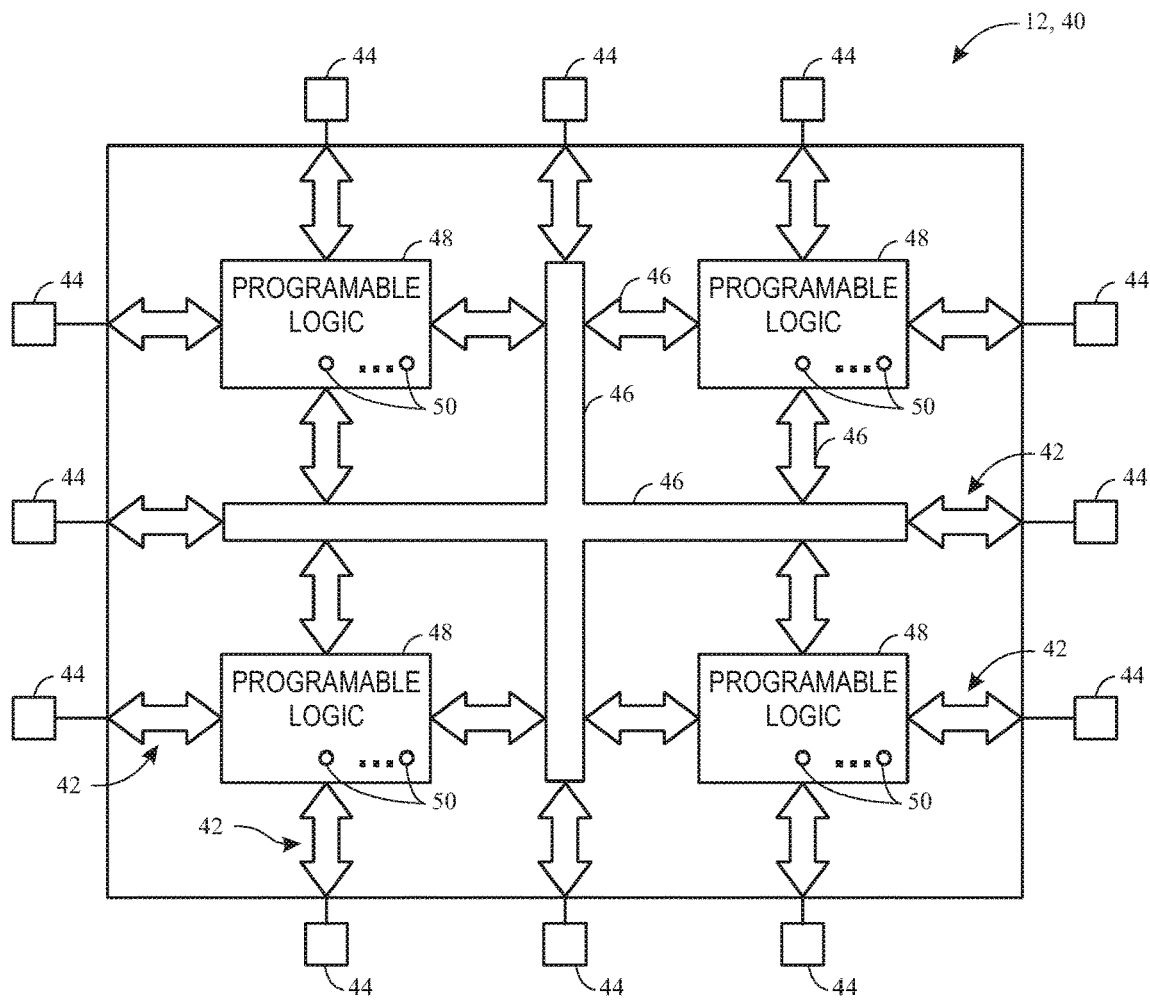
FIG. 2 is a block diagram of an integrated circuit where soft multipliers may be implemented, in accordance with an embodiment.

Turning now to a more detailed discussion of the IC 12, FIG. 2 illustrates an IC device 12, which may be a programmable logic device, such as a field programmable gate array (FPGA) 40. For the purposes of this example, the device 40 is referred to as an FPGA, though it should be understood that the device may be any type of programmable logic device (e.g., an application-specific integrated circuit and/or application-specific standard product). As shown, FPGA 40 may have input/output circuitry 42 for driving signals off of device 40 and for receiving signals from other devices via input/output pins 44. Interconnection resources 46, such as global and local vertical and horizontal conductive lines and buses, may be used to route signals on device 40. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48. As discussed in further detail below, the FPGA 40 may further include efficient soft multipliers that may rely on high Booth's radix 8 subset coding to define their architecture.

Programmable logic devices, such as FPGA 40, may contain programmable elements 50 with the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

Most programmable logic devices are electrically programmed. With electrical programming arrangements, the programmable elements 50 may be formed from one or more memory cells. For example, during programming, configuration data is loaded into the memory cells 50 using pins 44 and input/output circuitry 42. In one embodiment, the memory cells 50 may be implemented as random-access-memory (RAM) cells. The use of memory cells 50 based on RAM technology is described herein is intended to be only one example. Further, because these RAM cells are loaded with configuration data during programming, they are sometimes referred to as configuration RAM cells (CRAM). These memory cells 50 may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

The circuitry of FPGA 40 may be organized using any suitable architecture. As an example, the logic of FPGA 40 may be organized in a series of rows and columns of larger programmable logic regions, each of which may contain multiple smaller logic regions. The logic resources of FPGA 40 may be interconnected by interconnection resources 46 such as associated vertical and horizontal conductors. For example, in some embodiments, these conductors may include global conductive lines that span substantially all of FPGA 40, fractional lines such as half-lines or quarter lines that span part of device 40, staggered lines of a particular length (e.g., sufficient to interconnect several logic areas), smaller local lines, or any other suitable interconnection resource arrangement. Moreover, in further embodiments, the logic of FPGA 40 may be arranged in more levels or layers in which multiple large regions are interconnected to form still larger portions of logic. Still further, other device arrangements may use logic that is not arranged in a manner other than rows and columns.

As discussed above, the FPGA 40 may allow a designer to create a customized design capable of executing and performing customized functionalities. Each design may have its own hardware implementation to be implemented on the FPGA 40. In some instances, it may be desirable to enhance performance of soft multipliers implemented on an IC. In particular, in certain embodiments a high Booth's radix 8 subset coding may be utilized and mapped to a single level of FPGA logic.

In some embodiments, soft multipliers may utilize a modified Booth's algorithm to perform efficient multiplication operations. The modified Booth's algorithm may be used to perform high speed multiplication by splitting the bits of a multiplier into groups. The groups of multiplier bits may be decoded into multiplication operations that may be further decomposed into shift and addition operations in soft multiplier architecture implementation. The resulting multiplication operations may be applied to a multiplicand so that a number of partial products are generated. These partial products may be shifted and summed to arrive at a final, low precision result of a multiplication of the multiplier and the multiplicand.

The groups of multiplier bits may be split and later decoded in accordance with a coding scheme. For example, the commonly understood Booth's radix 8 coding may be summarized in Table 1, below. The first two columns of Table 1 (i.e., "Triplet" and "Trailing bit") may involve a group of bits considered from the multiplier in the multiplication operation. The third column in Table 1, "Code", may include operations to be performed on the multiplicand in the multiplication operation. The codes and subsequent operations may correspond to the group of bits in the first two columns of a respective row of the code. For example, if a group of multiplier bits includes a triplet "101" and the group's trailing bit is '1', then '−2' may be the code corresponding to this group of bits. In this case, the operation performed on the multiplicand may include shifting the multiplicand's bits left one bit and taking the complement of the result (i.e., multiply the multiplicand by negative two). In the case of a '+3' or '−3' code, an addition operation may also be used, as shifting the bits of the multiplicand may involve a multiplication or division by a factor of two. In some embodiments, this addition operation may involve a multiplicand*2+multiplicand operation (i.e., a '2' code summed with a '1' code).

Further, Booth's radix 8 may operate on a group of four bits. The group of four bits may consist of a triplet of bits and a trailing bit, which may include the most significant bit (MSB) of a previous triplet. For the least significant triplet, a '0' may be taken as the trailing bit. For example, a 12-bit multiplier may use groups {[3:1],'0'}, [6:3], [9:6], and [12:9]. Thus, the multiplier may be broken into overlapping groups of four bits, and a code corresponding to each group of four bits may be determined according to Table 1.

TABLE 1

Known Booth's Radix 8 Coding

| Triplet | Trailing bit | Code |
|---------|--------------|------|
| "000"   | '0'          | 0    |
| "000"   | '1'          | +1   |
| "001"   | '0'          | +1   |
| "001"   | '1'          | +2   |
| "010"   | '0'          | +2   |
| "010"   | '1'          | +3   |
| "011"   | '0'          | +3   |
| "011"   | '1'          | +4   |
| "100"   | '0'          | −4   |
| "100"   | '1'          | −3   |
| "101"   | '0'          | −3   |
| "101"   | '1'          | −2   |
| "110"   | '0'          | −2   |
| "110"   | '1'          | −1   |
| "111"   | '0'          | −1   |
| "111"   | '1'          | 0    |

TABLE 1-continued

Known Booth's Radix 8 Coding

Booth's radix 8 coding may be modified to a high radix Booth's subset coding by removing one or many codes (i.e., taking a subset of codes) in order to improve implementation efficiency. The removed codes may reduce the range of the multiplier, but the remaining supported range may be contiguous. For example, in some embodiments, the '−4' code may be ignored in order to create more efficient soft multiplier architecture. In some embodiments, the '+4' code may also be ignored because it may not occur. For example, in the case of a 3-bit multiplier, the trailing bit may always be zero, and as such, the sequence "0111" for a '+4' code may not occur. Thus, the remaining supported range may be contiguous (e.g., +7 to −7 for the 3-bit multiplier), and the multiplication operations may be symmetrical about 0. As a result of the reduced multiplier range, the resulting multiplier may fit very efficiently into FPGA devices.

Figure 3:
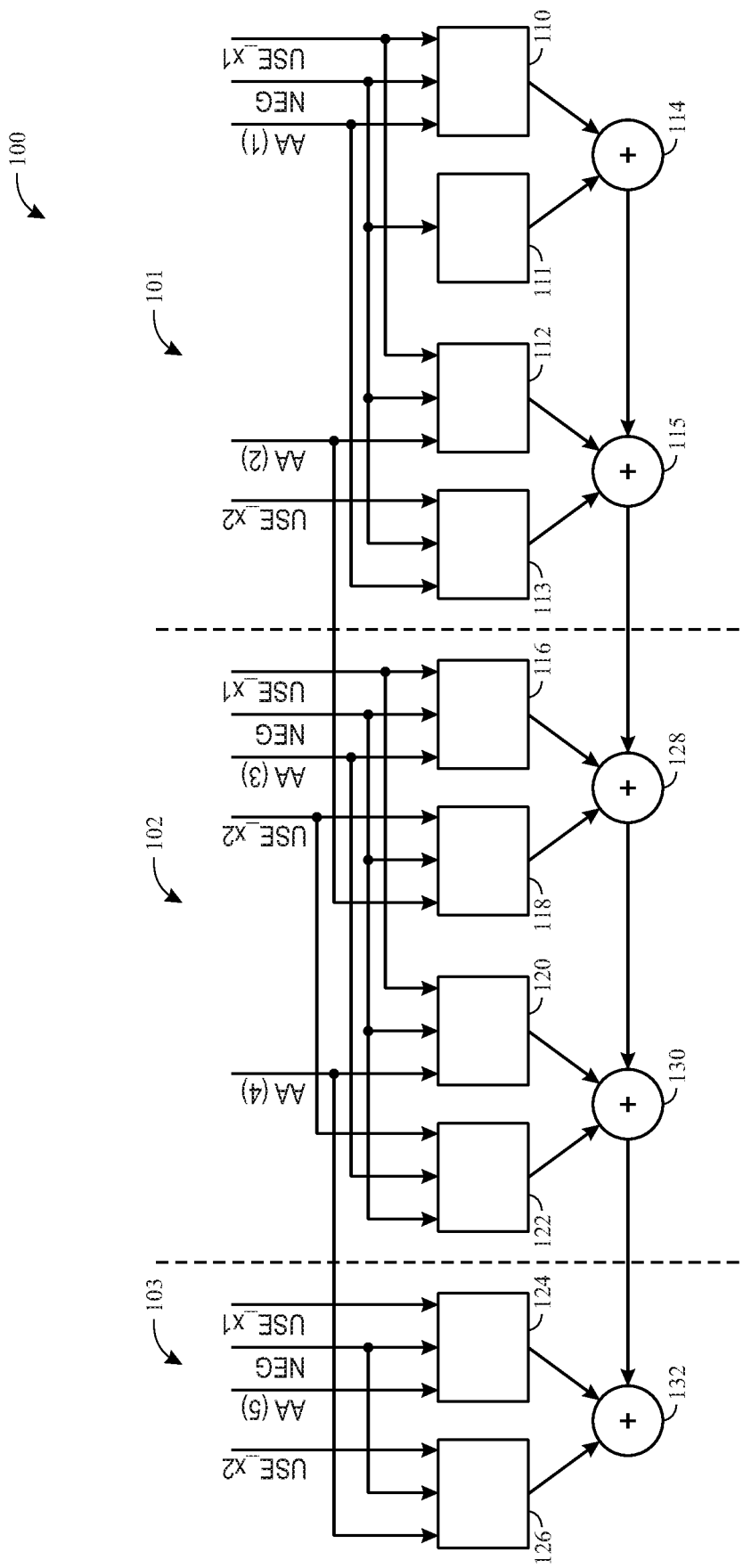
FIG. 3 is a block diagram of an N×3 multiplier which is optimized according to the disclosed techniques, in accordance with an embodiment.

Accordingly, FIG. 3 illustrates an embodiment of Booth's modified radix 8 coding mapped with a 3-bit signed multiplier 100, which may be implemented on an FPGA. FPGAs may have some amount of soft logic, implemented with look up tables (LUT) (i.e., 110-113, 116, 118, 120, 122, 124, and 126) followed by a dedicated ripple carry adder (i.e., 114, 115, 128, 130, and 132). In some embodiments, an optional register level may follow the adder. Further, in some embodiments, a group of four 3-input LUTs (and two ripple carry bits) can be grouped into an adaptive logic module (ALM) (e.g., ALM 101 made up of components 110-115). In the present embodiment, ALMs 101, 102, and 103 may form the first three ALMs of the 3-bit signed multiplier 100. Additional ALMs may be added to the left of ALM 103 to implement the multiplicand. In some embodiments, the size of the multiplicand may be determined by the number of ALMs used to the left of ALM 103. As such, the multiplicand may have any suitable size (i.e., N bits) that a suitable number of ALMs may implement. Thus, with a 3-bit signed multiplier 100, N×3 multiplication may be implemented, and in the present embodiment, illustrating a five bit multiplicand, 5-bit×3-bit multiplication may be performed.

The look up tables may be arranged in several ways. In some arrangements, two 3-input look up tables may each feed into a separate input of the ripple carry adder. Further, the LUTs feeding into the same ripple carry adder may be considered paired (e.g., 110 and 111). Thus, each pair of LUTs may have 6 independent inputs (i.e., 3 inputs per LUT).

In some embodiments each LUT may receive input signals which may include: USE_X1, USE_X2, NEG, AA(x), AA(x+1), and/or AA(x−1), for example. USE_X1 and USE_X2 may represent an "x1" and an "x2" case, respectively. That is, the LUT may receive an input to USE_X1 to communicate that the '+/−1' code may be used as a multiplier operation, while a USE_X2 signal may communicate that the '+/−2' code may be used as the multiplier operation. In the present embodiment, the NEG signal may indicate that the multiplication operation is negative. The AA(x), AA(x+1), and AA(x−1) may each represent a multiplicand bit, where 'x' indicates an index of the bit in the multiplicand. For example, with an 'x' value of 3, AA(x) may

| Triplet | Trailing bit | Code |
|---------|--------------|------|
| "110"   | '1'          | −1   |
| "111"   | '0'          | −1   |
| "111"   | '1'          | 0    | correspond to the third bit of the multiplicand, while AA(x+1) may correspond to the fourth bit, and AA(x−1) may correspond to the second bit in the multiplicand.

The USE_X1, USE_X2, and NEG inputs on each LUT may receive signals from a decoder. That is, a decoder may receive a triplet of multiplier bits with a trailing '0', and the decoder may output the appropriate code, or operation, associated with the sequence of bits received, according to the high Booth's radix 8 subset coding (i.e., Table 1 without '+/−4' codes). Thus for a 3-bit multiplier sequence of "111" with a trailing '0', the decoder may output a '−1' code to be used as a multiplier operation. To convey this output, the USE_X1 and NEG signals may be set by the output of the decoder. In the case of '−4' (i.e., "100" with a trailing '0'), the decoder may not recognize a valid input code, as '−4' is ignored. As a result, the decoder may not set USE_X1 nor USE_X2, and the result of the multiplier may be zero.

In some embodiments, each LUT may receive a USE_X1 or USE_X2 signal to a first input, a NEG signal to a second input, and a AA(x), AA(x−1), or AA(x+1) signal to a third input. Each LUT may use a combination of each of its inputs to look up and output a corresponding multiplication result from its table. In the present embodiment, the right LUT (i.e., 110, 112, 116, 120, and 124) of each LUT pair may be used for the "x1" case. That is, the right LUT may receive a USE_X1 signal as an input. The left LUT (i.e., 111, 113, 118, 122, and 126) may be used for the "x2" case (i.e., the USE_X2 signal is an input). For the "x3" case, both LUTs may be used. That is, the USE_X1 signal input to the right LUT (i.e., 110, 112, 116, 120, and 124) and the USE_X2 signal input to the left LUT (i.e., 111, 113, 118, 122, and 126) may both be set so that both operations may be performed on the multiplicand.

Further, in some embodiments, the inputs associated with the LUTs may not be independent of each other. Instead, in some embodiments, a subset of shared inputs may be used across a pair of LUTs (e.g., 110 and 111) and/or across adjacent LUTs that are not paired (e.g., 112 and 118). For example, in the present embodiment, each left LUT of each LUT pair may share a multiplicand bit (i.e., AA(x), AA(x−1), or AA(x+1)) with the right LUT of the LUT pair to the right. For example, right LUT 112 may receive AA(2) as a data input, and right LUT 112 may share AA(2) with left LUT 118 from a different LUT pair.

Additionally, the NEG signal may be shared between all the LUTS (i.e., 110-113, 116, 118, 120, 122, 124, and 126) within and across each ALM 101, 102, and 103, as illustrated in the present embodiment. As a result, the NEG signal may invert (i.e., one's complement) multiplicand vectors. The multiplicand vectors may be represented by the multiplicand bits (i.e., AA[5:1]) received at the right LUTS 110, 112, 116, 120, 124 (i.e., multiplicand vector one) and the left LUTS 113, 118, 122, 126 (i.e., multiplicand vector two), respectively. In some cases, it may be desirable not to invert both vectors. For example, in the case of a '−2' code, the USE_X1 value is not set. Thus, the multiplicand vector one value may be "0000 . . . 000". However, the common NEG signal may negate this value, which may then be represented in one's complement as "1111 . . . 111." In such cases, it may not be desirable to invert the multiplicand vector one. However, external adjustment, for example, may be used to correct the vector's value. In the present embodiment, the left LUT 111 of the least significant bit (LSB) of the multiplier may lack a data input (i.e., AA(x), AA(x−1), or AA(x+1)). As such, the NEG bit may route through this data input to change the one's complement value of the multiplicand vector one to a two's complement value. When the NEG value is added to the least significant bit, a '1' may be added to the negated multiplicand vector one (i.e., "1111 . . . 111"), converting it to a two's complement value, which may be represented as originally desired as "0000 . . . 000".

In the case of two's complement, an adjustment for the NEG signal may not be made in the same level of logic as described above for the case of one's complement. Because the case of a two's complement value may likely be the result of a dot product, corrections may instead be collectively coded into a single number for the entire dot product. In some embodiments, the corrections used may include the addition of the value "000 . . . 010", which may be accomplished by the addition of a single bit, albeit with the effect of a carry across the entire number. In order to add this correction, an incomplete tuple in an adder tree of the dot product may be located, and the correction may be added at the end of the incomplete tuple, as will be discussed in further detail.

Figure 4:
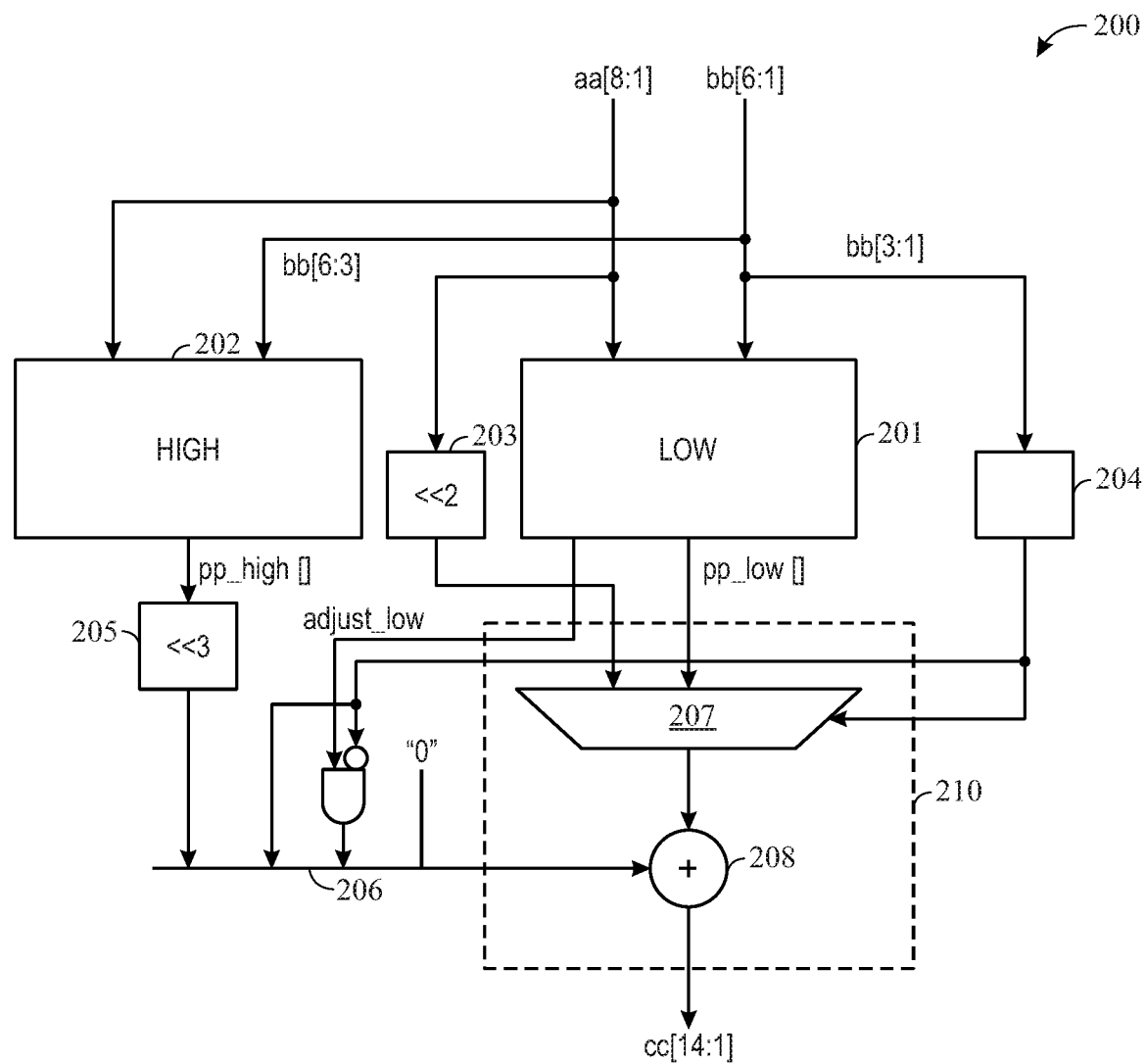
FIG. 4 is a block diagram illustrating an N×6 multiplier which is optimized according to the disclosed techniques, in accordance with an embodiment.

As described, the current embodiment implements an N×3 multiplication, balanced around 0, where the contribution of the multiplication is contained in a single level of logic. However, this method may also be expanded to implement a very efficient N×6 multiplication as well, as illustrated in FIG. 4. That is, a 6-bit signed multiplier 200 may be used instead of a 3-bit signed multiplier 100.

In the case of N×6 multiplication, the multiplier may be broken into two groups of bits (i.e., {[3:1], '0'} and [6:3]). Each group of bits may be evaluated according to the subset of Booth's radix 8 coding taken, or Table 1, to determine the codes for the suitable multiplier operations corresponding to the multiplier bit groups. As a result, two codes, or multiplication operations, will be used. That is, the 6-bit signed multiplier 200 may be evaluated similarly to two 3-bit signed multipliers 100. Thus, the structure used to implement N×3 multiplication, as illustrated in FIG. 3, may be implemented twice (e.g., as high block 202 and low block 201) for N×6 multiplication. The high block 202 may handle the multiplication by the "high" bits of the multiplier (i.e., bb[6:3]). In some embodiments, the low block 201 may handle the multiplication by the "low" bits of the multiplier (i.e., bb[3:1]) with a trailing '0', as discussed earlier. Both the high block 202 and the low block 201 may receive all of the bits from the multiplicand. In the illustrated embodiment, for example, which pictures an 8-bit multiplicand, the entire multiplicand may be multiplied according to the appropriate operation (i.e., from Table 1) corresponding to the low bits of the multiplier in low block 201, and the entire multiplicand may simultaneously be multiplied according to the appropriate operation (i.e., from Table 1) corresponding to high bits of the multiplier in high block 202. Before summing the results of the high block 202 and the low block 201, additional logic may be involved, as will be discussed in further detail below.

Although high block 202 and low block 201 match the N×3-bit multiplication illustrated in FIG. 3, in some cases the '−4' code may no longer be ignored in the 6-bit signed multiplier. That is, when the three low bits (i.e., bb[3:1]) of the multiplier are "100" and with the trailing bit automatically assumed to be '0', a '−4' code may result, according to Table 1. While the '−4' may have occurred in the 3-bit signed multiplier 100 but was selectively ignored, as described earlier, the '−4' may be a valid code in the 6-bit signed multiplier 200 in order to support a contiguous range of −27 to +27, centered around 0. Though, as low block 201 may be identical to the 3-bit signed multiplier 100 of FIG. 3, additional structures may be used to facilitate the '−4' code. Thus, block 204 may be added to the multiplier architecture to detect whether the '−4' condition has occurred. In some embodiments, the output of block 204 may be used as the select input of mux 207. When the '−4' condition is detected by block 204, the mux 207 may select the complemented output of block 203 as its output. Block 203 may left shift the multiplicand by two bits. Thus, the complement of the output of block 203 may represent the multiplicand multiplied by −4. When '−4' is not detected by block 204, the mux 207 may select the partial product (i.e., pp_low[ ]) resulting from the output of low block 201.

In some embodiments, the high block 202 may lack connectivity to additional structures, such as block 203, 204, and mux 207, to handle the '+/−4' code conditions that may occur due to the input of bits bb[6:3]. As a result, the '+/−4' codes may be ignored during the multiplication of the multiplicand aa[8:1] and the code resulting from the Booth's radix 8 coding of multiplier bits bb[6:3]. However, in some embodiments, the high block 202 may connect to structures to detect and handle the '+/−4' codes (e.g., such as discussed above), but such embodiments may minimize the optimization effects resulting from removing the codes, as the additional structures may require more area and/or resources.

Further, as this structure may be based on a modified Booth's radix 8 algorithm, the result of the high block 202 is left shifted by 3 bits at block 205. That is, the first three bits of the partial product resulting from the high block 202 (i.e., pp_high[ ]) may be "000". A signal 206 including the bits from pp_high[ ] may add to the output of mux 207 to obtain the result of the multiplication operation (i.e., cc[14:1]). In some embodiments, the signal 206 may assert '0' as its first bit (i.e., bit[1]), as FIG. 4 illustrates. Further, the second bit of the signal 206 may be determined by the output of low block 201. If pp_low[ ] is negative it may be output from low block 201 in one's complement format, which may desirably be converted to two's complement format by setting bit[2] of signal 206 as a corrective factor. In some embodiments, the logical AND of an adjust_low signal, which may be set by low block 201 to correct its output (i.e., pp_low[ ]), and the complement (i.e., NOT gate output) of the output of block 204 may determine the value of bit[2]. Thus, the bit[2] may only be set to correct pp_low[ ] if block 204 did not detect a '−4' condition. Further, in some embodiments, if a '−4' condition exists, a '1' may be inserted at bit [3] of signal 206 instead of at bit[2]. In other words, following the same logic in the 3-bit signed multiplier 100 in which the NEG signal may route into LUT 111 to counteract negation errors, a set of correction factors (i.e., bit[2] and/or bit[3]) may be set in signal 206 to account for any error that may exist due to negation and/or errors relating to desired one's complement versus two's complement outputs.

In the illustrated embodiment of FIG. 4, each of the radix 8 multipliers (i.e., high block 202 and low block 201) may be considered a single level of logic. Additionally, block 210, which may include mux 207 and the adder 208, may involve a single level of logic. Further, the control block 204 may be calculated in parallel with low block 201, and the shift operations of blocks 203 and 205 may be considered free operations, as there may not be any actual logic involved. As such, in some embodiments, N×6 multiplication may only utilize two levels of logic.

Figure 5:
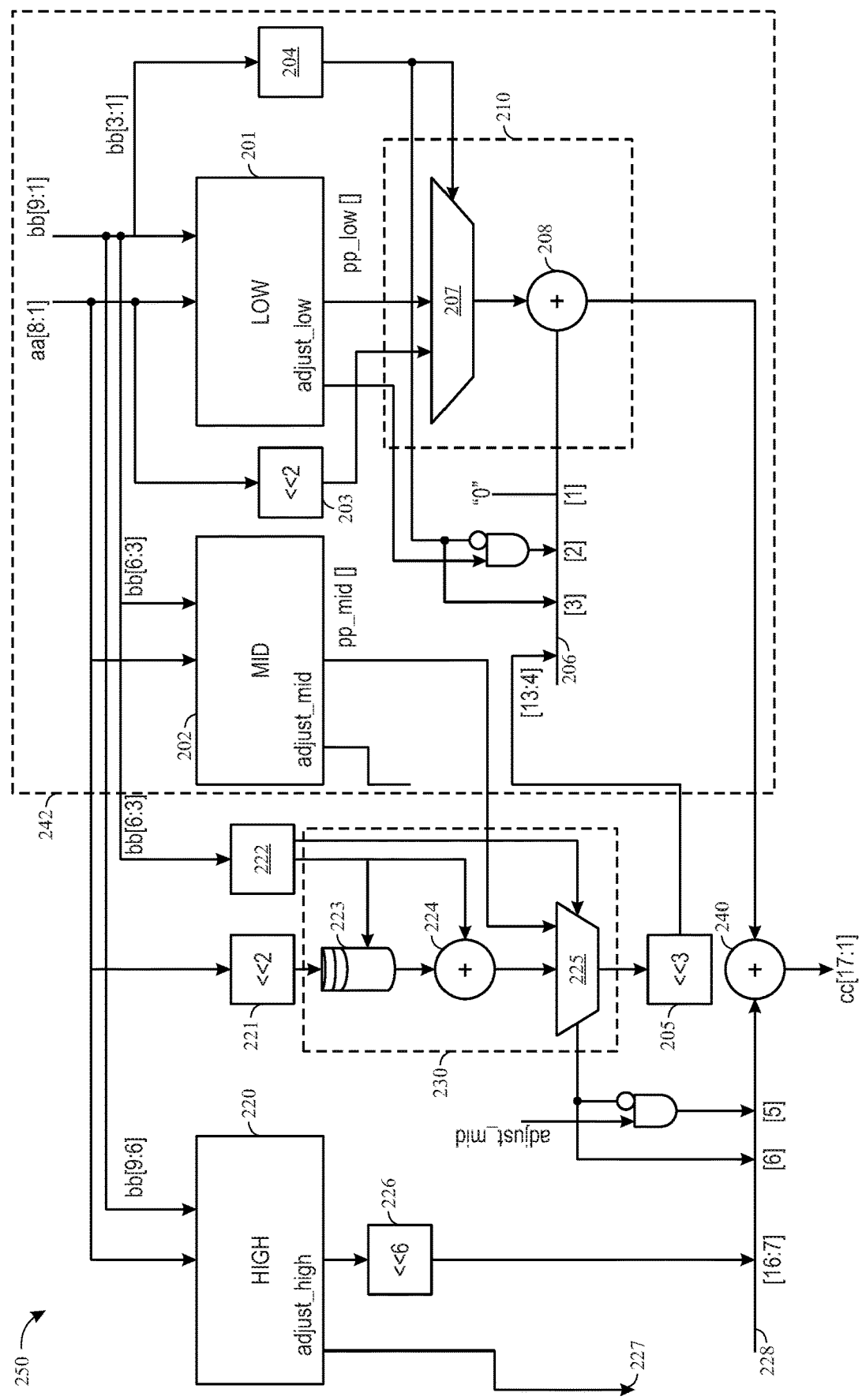
FIG. 5 is a block diagram illustrating an N×9 multiplier, in accordance with an embodiment.

In some embodiments, this method may also be extended to larger multipliers. Accordingly, FIG. 5 illustrates an example embodiment of N×9 multiplication utilizing a 9-bit signed multiplier 250. In the illustrated embodiment, the N×9 multiplier may include an N×3 multiplier (i.e., high block 220), an N×6 multiplier (i.e., 242), and additional logic coupled together. Thus, blocks 220, 202, and 201 may build upon instances of the structure illustrated in FIG. 3. The bits of the multiplier (i.e., bb[9:1]) may be grouped into three sets of four (i.e., {bb[3:1], '0'}, bb[6:3], and bb[9:6]), which may be considered the low, middle (i.e., mid), and high bits of the multiplier, respectively. As in the case of the N×6 multiplier, low block 201 may receive the low bits of the multiplier (i.e., {bb[3:1], '0'}), and mid block 202 may receive the middle bits of the multiplier (i.e., bb[6:3]). The high block 220 may receive the remaining high bits of the multiplier (i.e., bb[9:6]). Before summing the results of the high block 220 with the sum of the mid block 202 and the low block 201, additional logic may be involved, as will be discussed in further detail below.

In the case of a 9-bit signed multiplier 250, the condition where the low bits {bb[3:1], '0'} may cause a '−4' may still arise and may be handled by the same logic blocks illustrated in the N×6 multiplier (i.e., 204, 207, 203). However, new conditions may also arise due to the additional multiplier bits in comparison with a 6-bit signed multiplier 200. With the trailing bit of the middle bits of the multiplier, bb[6:3], coinciding with the MSB of the low bits of the multiplier, {bb[3:1], '0' }, both the '+/−4' code conditions may occur. That is, both "0111" and "1000" may occur as valid values of bb[6:3], which may be interpreted by Booth's Radix 8 coding to a '+4' and a '−4', respectively. Further, to generate an appropriate '+4' or '−4' condition according to the value of the middle multiplier bits bb[6:3], in some embodiments, block 230 may be used. Accordingly, at block 221, the multiplicand bits aa[8:1] may be left shifted by two bits, or multiplied by '+4', regardless of the value of the middle bits bb[6:3]. Block 222 may determine the value of bits bb[6:3] to determine whether a '+/−4' condition is met. The output of block 222 may route to an XOR gate 223 and an adder 224 to complement the value of the output of block 221 when necessary to generate the '−4' condition. As such, the output of adder 224 may involve −4*multiplicand or +4*multiplicand. This output may feed into mux 225 along with the partial product output by mid block 202 (i.e., pp_mid[ ]). Further, the output of block 222 may also route into the select of mux 225 to select between the result of the '+/−4' conditions or the output of block 202 (i.e., pp_mid[ ]). The output of 230 may then be left shifted by three bits by block 205 to align the middle multiplier result correctly. In other embodiments, the generation of the '+/−4' cases may be accomplished using other methods that may incorporate these values into the multiplier structures, which may have different fitting characteristics depending on the device.

Further, before summing the high block 220 results with the sum of the mid 202 and low block 201, the partial product output by high block 220 (i.e., pp_high[ ]) may be left shifted by six bits, as the pp_mid[ ] bits may be left shifted by three bits. The output of block 226 may be summed along a signal 228. Signal 228 may have a corrective factor set in bit[5] or bit[6] depending on the sign of the pp_mid[ ] result and the presence/absence of a '+/−4' condition, as the N×6 multiplier had for the '−4' condition and a negative pp_high[ ]. As such, the mid block 202 may output a correction factor, adjust_mid, to make a suitable correction to signal 228. In some embodiments, the signal 228 may add with the sum of the lower multiplier components, added together at adder 208, at adder 240. Further, an adjust_high signal 227 may add into the result of adder 240 (i.e., cc[17:1]) or into another architecture stage that may use the result of adder 240. That is, the adjust_high signal 227 may represent a corrective factor for the high block 220 multiplier, but unlike adjust_mid and adjust_low, there may not be a place within the multiplier architecture to add the corrective factor into a product or partial product. Thus, the adjust_high signal 227 may route outside of the multiplier architecture to add into the multiplier's result at another stage.

In the illustrated embodiment of FIG. 5, similar to the embodiment of an N×6 multiplier, each of the multipliers (i.e., 220, 202, and 201) may be considered a single level of logic. Further, although XOR gate 223, adder 224, and mux 225 appear to be spread over two levels of logic, as an adder may be structured as the output stage of a level of logic, the mux 225 may be logically pushed back in front of the adder 224 by synthesis techniques.

Further, while the illustrated embodiments of FIGS. 3-5 demonstrate N×3, N×6, and N×9 bit signed multipliers, respectively, in some embodiments, multipliers with additional suitable sizes may be created using the techniques discussed herein.

As discussed earlier, in some embodiments, a correction value may be added to the output of one or more multipliers. If the correction is implemented in isolation, e.g., to a single multiplier, an entire adder level may be consumed, which may be wasteful. Alternatively, in some embodiments, where ternary addition structures may be available, the correction may be added using ternary adders. However, ternary adders may not pack well at scale in FPGA due to routing density. In some embodiments, however, several multipliers may be added together for use in many applications, such as in the case of a dot product. Thus, it may be beneficial to use an adder tree to apply a correction factor across several multipliers instead of to a single multiplier.

Figure 6:
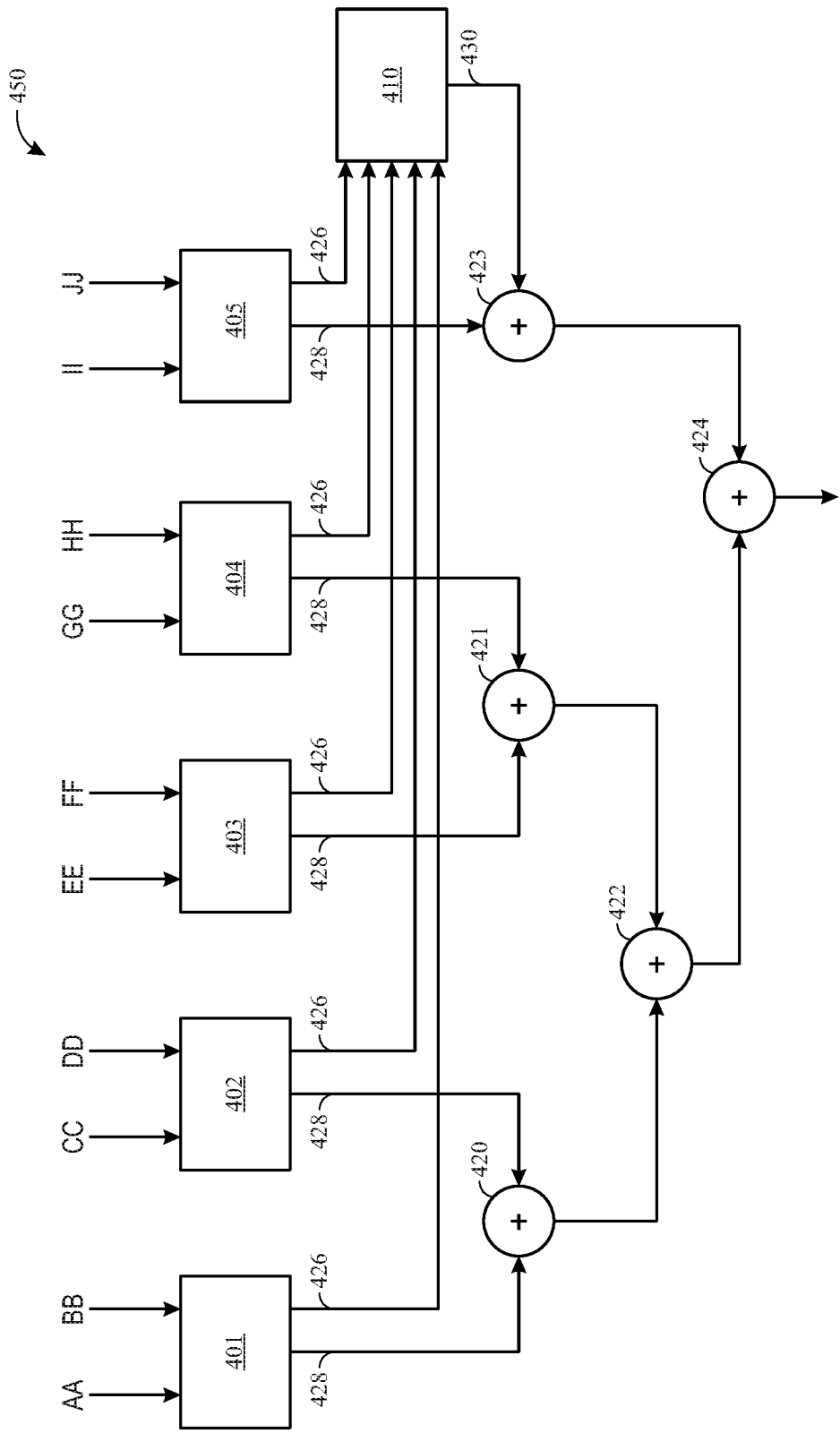
FIG. 6 is a block diagram illustrating a correction factor added to the output of the multiplier, in accordance with an embodiment.

Accordingly, FIG. 6 illustrates an embodiment of an adder tree 450 implemented across five multipliers (e.g., 401-405) in order to apply a correction factor. The multipliers 401-405 may be of any suitable size, such as N×3, N×6, or N×9, for example. Further, in some embodiments, each multiplier 401-405 may output a single bit correction factor 426 (e.g., adjust_low, adjust_mid, adjust_high), as well as an uncorrected result 428 of the multiplier's operation. In some embodiments, however, the multiplier architectures may enable each multiplier to output multiple bits, or encoded numeric values, such as a number of bits already combined into an integer correction value, as a correction value. Block 410 may receive each of the correction bits 426 from the multipliers 401-405 as inputs. In some embodiments, block 410 may then sum the correction bits 426 into a single correction integer 430. The single correction integer 430 output by block 410 may add into the adder tree at adder 423. In the illustrated embodiment, adder 423 may represent an incomplete tuple in the adder tree 450. That is, because there are an odd number of multipliers, adders 420 and 421 receive both inputs from a multiplier (i.e., 401 and 402 and 403 and 404, respectively). However there is no pair of multipliers to serve as inputs at adder 423, resulting in an incomplete tuple where the correction integer 430 may add in. By adding the correction integer 430 into the adder tree 450 at 423, its correction effects are propagated to adder 424 its final output. As such, the corrections for each of the multipliers 401-405 may be summed and applied simultaneously so that all the corrections may be present in the final output of adder 424. In some embodiments, however, the adder tree 450 may not contain an incomplete tuple for the correction integer 430 to add into, and in cases as such, the adder tree 450 may contain an additional adder to incorporate the correction integer 420 into the final sum.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A programmable logic device, comprising:
   a multiplier coding, comprising one or more coded multiplier values; and
   a multiplier configured to perform a multiplication operation based on the multiplier coding for each of the one or more coded multiplier values corresponding to a value between negative three and positive three, inclusive, wherein the multiplier skips implementation for a subset of the one or more coded multiplier values, wherein the subset comprises at least one coded multiplier value corresponding to a value less than negative three, greater than positive three, or both, wherein the multiplier comprises two look-up tables for each bit of a multiplicand to be multiplied by a coded multiplier value.

2. The programmable logic device of claim 1, wherein one or more highest magnitude coded multiplier values in the multiplier coding comprise the subset of the coded multiplier values.

3. The programmable logic device of claim 1, wherein the multiplier coding is a Booth's radix 8 coding.

4. The programmable logic device of claim 3, wherein the subset comprises a coded multiplier value for +4, −4, or a combination thereof.

5. The programmable logic device of claim 1, wherein the multiplication operation comprises an addition operation, a shift operation, or a combination thereof.

6. The programmable logic device of claim 1, wherein the programmable logic device comprises a field-programmable gate array (FPGA).

7. The programmable logic device of claim 6, wherein the multiplier is implemented in programmable logic of the FPGA.

8. The programmable logic device of claim 7, wherein the multiplier is implemented in the programmable logic of the FPGA based on a first program generated by a compiler.

9. The programmable logic device of claim 1, wherein the multiplier comprises a plurality of pairs of look-up tables (LUTs).

10. The programmable logic device of claim 9, wherein each LUT in the plurality of pairs of LUTs is a three-input LUT.

11. The programmable logic device of claim 9, wherein each pair of the plurality of pairs of LUTs comprises:
    a first LUT configured to output a first value having a magnitude of one when a multiplicand is to be multiplied by a coded multiplier value corresponding to a value having a magnitude of one or three; and
    a second LUT configured to output a second value having a magnitude of two when the multiplicand is to be multiplied by a coded multiplier value corresponding to a values having a magnitude of two or three.

12. A tangible, non-transitory, machine-readable medium, comprising machine-readable instructions that, when executed by one or more processors, cause the one or more processors to:

generate a program describing a hardware implementation for a multiplier;
cause the multiplier to be implemented on programmable logic of a programmable logic device, wherein the multiplier, when implemented on the programmable logic device:
is configured to perform a multiplication operation based on one or more coded multiplier values of a plurality of coded multiplier values for each of the one or more coded multiplier values corresponding to a value between negative three and positive three, inclusive, wherein the multiplier skips implementation of the multiplication operation for a subset of the plurality of coded multiplier values, wherein the subset comprises at least one coded multiplier value corresponding to a value less than negative three, greater than positive three, or both; and
comprises a plurality of additional multipliers each configured to generate a partial product.

13. The tangible, non-transitory, machine-readable medium of claim 12, wherein:
the plurality of additional multipliers comprises a first multiplier configured to generate a first partial product; and
the multiplier, when implemented on the programmable logic device, comprises a multiplexer configured to receive the first partial product and a value corresponding to a shifted multiplicand.

14. The tangible, non-transitory, machine-readable medium of claim 13, wherein:
the multiplier, when implemented on the programmable logic device, comprises a logic block configured to generate an output indicative of whether the coded multiplier value is included in the subset of the plurality of coded multiplier values; and
the multiplexer is configured to:
receive the output of the logic block; and
output either the first partial product or the value corresponding to the shifted multiplicand based on the output of the logic block.

15. The tangible, non-transitory, machine-readable medium of claim 14, wherein the multiplexer is configured to output the first partial product when the output of the logic block is indicative of the coded multiplier value corresponding to a value not included in the subset of the plurality of coded multiplier values.

16. The tangible, non-transitory, machine-readable medium of claim 12, wherein the programmable logic device comprises a field-programmable gate array (FPGA).

17. A method, comprising:
decoding a set of multiplier values based on a multiplier coding; and
performing a multiplication operation via multiplier circuitry based on the set of multiplier values for each multiplier value of the set of multiplier values corresponding to a value between negative three and positive three, inclusive, wherein the multiplier circuitry skips implementation for a subset of the multiplier values, wherein the subset comprises at least one multiplier value corresponding to a value less than negative three, greater than positive three, or both, wherein the multiplier circuitry comprises two look-up tables for each bit of a multiplicand to be multiplied by a multiplier value.

18. The method of claim 17, wherein performing the multiplication operation comprises:
determining a first partial product;
determining a second partial product;
generating a shifted second partial product by shifting a value of the second partial product;
generating a bit value based on whether a multiplier value of the plurality of multiplier values is included in the subset of multiplier values, wherein the bit value is less significant than each bit value of the shifted second partial product; and
summing the first partial product, the shifted second partial product, and the bit value.

19. The method of claim 17, wherein the multiplier circuitry is implemented on a programmable logic device.

20. The method of claim 19, wherein the programmable logic device comprises a field-programmable gate array (FPGA).

* * * * *